United States Patent [19]
Rostoker et al.

[11] Patent Number: 4,793,933
[45] Date of Patent: Dec. 27, 1988

[54] WASTE TREATMENT METHOD FOR METAL HYDROXIDE ELECTROPLATING SLUDGES

[75] Inventors: William Rostoker, Chicago; John Dvorscek, Oak Lawn, both of Ill.

[73] Assignee: Rostoker, Inc., Burnham, Ill.

[21] Appl. No.: 120,928

[22] Filed: Nov. 16, 1987

[51] Int. Cl.[4] .................................................. C02F 1/70
[52] U.S. Cl. .................................... 210/710; 210/719; 210/721; 210/737; 210/751; 210/904; 210/912
[58] Field of Search ............... 210/710, 716, 717, 719, 210/720, 751, 757, 758, 766–769, 774, 904, 912, 913, 721, 737, 919; 106/74, 76, 78, 83, 84, 117, 120; 252/628, 629

[56] References Cited
U.S. PATENT DOCUMENTS

| | | | |
|---|---|---|---|
| 3,878,289 | 4/1975 | Beavon | 423/219 |
| 3,962,080 | 6/1976 | Dulin et al. | 210/751 |
| 4,086,326 | 4/1978 | Blount | 423/332 |
| 4,116,830 | 9/1978 | Krogsrud | 210/63 R |
| 4,130,440 | 12/1978 | Nose et al. | 106/74 |
| 4,147,713 | 4/1979 | Blount | 260/448.8 R |
| 4,209,421 | 6/1980 | Heimerl et al. | 252/301.1 W |
| 4,329,248 | 5/1982 | Ringwood | 252/628 |
| 4,376,070 | 3/1983 | Pope et al. | 252/629 |
| 4,383,944 | 5/1983 | Ondvacek | 252/628 |
| 4,395,367 | 7/1983 | Rohrmann et al. | 252/629 |
| 4,404,105 | 9/1983 | Rysman de Lockerente et al. | 210/716 X |
| 4,432,666 | 2/1984 | Frey et al. | 210/751 X |
| 4,437,417 | 3/1984 | Roberts | 110/346 |
| 4,460,500 | 7/1984 | Hultgren | 252/628 |
| 4,469,628 | 9/1984 | Simmons et al. | 252/629 |
| 4,482,481 | 11/1984 | Bandyopahyay et al. | 252/628 |
| 4,490,287 | 12/1984 | Hardwick et al. | 252/629 |
| 4,534,893 | 8/1985 | Dippel et al. | 252/629 |
| 4,600,514 | 7/1986 | Conner | 210/751 |
| 4,705,639 | 11/1987 | Aldrich | 210/720 |
| 4,707,270 | 11/1987 | Kobayashi et al. | 210/716 X |

FOREIGN PATENT DOCUMENTS 2146257 3/1973 Fed. Rep. of Germany .
53-117677 10/1978 Japan .
58-67397 4/1983 Japan .

OTHER PUBLICATIONS

Bamberger, C. E., *Reaction of Silicon Dioxide with Sodium Cyanide at 1000° C.*, (See Info. Disclosure Statement).
Freeman, H., *Innovative Thermal Hazardous Organic Waste Treatment Processes* (See Info. Dis. Statement).
Chemical Abstracts 101:113176j (See Info. Disclosure Statement).
Chemical Abstracts 95:176418t (See Info. Disclosure Statement).
Chemical Abstracts 87:58206j (See Info. Disclosure Statement).
Chemical Abstracts 83:33359r (See Info. Disclosure Statement).
Chemical Abstracts 73:111461c (See Info. Disclosure Statement).

*Primary Examiner*—Tom Wyse
*Attorney, Agent, or Firm*—Arne R. Jarnholm

[57] ABSTRACT

A waste treatment method for metal hydroxide electroplating sludges. Metal hydroxide sludges from the treatment of electroplating waste waters are rendered environmentally safe. The sludges are first dewatered and heated to a temperature sufficient to cause the metal hydroxides to convert to metal oxides. Predetermined quantities of silica and soda, or sources thereof, are mixed with the metal oxides. The mixture is further heated to a temperature sufficient to cause fusion of the mixture and form a slag-like composition having the metal oxides in chemical solution. The slag-like composition is then cooled to ambient temperature. The structure of the cooled slag-like composition is predominantly crystalline, having the metal oxides in solid solution in either a precipitate phase or a silicate matrix. The slag-like composition is resistant to corrosion even in an acidic environment.

17 Claims, 3 Drawing Sheets

WASTE TREATMENT METHOD FOR METAL HYDROXIDE ELECTROPLATING SLUDGES

FIELD OF THE INVENTION

The present invention relates generally to the field of chemical waste disposal and more particularly to a process adapted for treating metal hydroxide sludges generated by the electroplating industry.

DESCRIPTION OF THE PRIOR ART

The electroplating industry has long had difficulty finding a safe and economical way to dispose of the heavy metal sludge wastes that are generated by their rinse water cleaning systems. The disposal of these sludges (EPA hazardous waste No. F006, hereinafter sometimes referred to as "F006 wastes", "F006 sludges" or simply "sludges") has also become a major problem for the general public and environment. Because these sludges often contain high concentrations of toxic, heavy metals (such as hexavalent chromium) and complex cyanides (all of which may be leachable into ground water), land fill disposal, without further treatment, cannot be considered a safe or viable solution for elimination.

Many solutions for the disposal of these sludges have been suggested. It is believed that the most frequently used method involves the mixing of the sludges with an hydraulic setting cement, such as a high-grade blast furnace slag cement or portland cement. This solution has the drawback that the addition of cement substantially increases the weight and volume of the material which must be disposed. Although the hydraulic cements are fairly stable in the environment, they are subject to attack by acids and thus, vulnerable to leaching of the heavy metals into the environment. Furthermore, after setting, the cement-sludge mixtures can be very difficult to break-up into easily handled sizes for relocation. Thus, the cement-sludge mixtures must often be cast in situ at the land fill site.

Finally, in spite of the difficulty of granulating hydraulic cement composites, their long term integrity is suspect. Cement composites tend to spall and weather, thus increasing the likelihood of their heavy metal constituents leaching into the environment.

Other methods for treating hazardous wastes of a general nature, have been suggested by Battelle-Northwest using a Joule-Heated Glass Melter, and Penberthy Electromelt International using an Electromelt Pyroconverter, as reported in *Innovative Thermal Hazardous Organic Waste Treatment Processes* (Freeman, H. Ch. 6 Molten Glass, Pollution Technology Review No. 125, pp. 44–54, Noyes Publications, N.J., 1985). In each of these processes, the hazardous waste is introduced into a hot furnace filled with molten glass. Combustible organics are burned and, noncombustibles are added to the glass. These processes suffer from the drawback that the glass only works to encapsulate the hazardous noncombustible wastes. Furthermore, glasses are generally very viscous and therefore, very difficult to remove from the furnace.

Thus, there exists a long-felt need for technology that can render these sludges environmentally safe and which produces an end product that is relatively easy to handle. Such technology should convert the sludge to a physical state wherein the hazardous components are either chemically decomposed or rendered substantially nonreactive under the type of conditions expected to be encountered in a land fill environment. Criteria for identifying the characteristics and sources of hazardous wastes and procedures for toxicity testing are set forth in the United States Code of Federal Regulations, specifically 40 CFR Part 261.10 et seq., incorporated herein by reference.

As used herein then, the term "environmentally safe", as applied to the condition of sludges after treatment by the method of the present invention, or by some other treatment method, means that the treated sludges meet the Federal EPA criteria for nontoxicity.

The waste treatment method of the present invention, as practiced on F006 sludges, produces an end product tha is environmentally safe. That is to say, an end product wherein the cyanide compounds are decomposed and the heavy metals amenable to leaching are below the limits imposed by 40 CFR § 261.24, *Characteristic of EP Toxicity*. Furthermore, initial test results indicate that the method produces good results when applied to chromium-bearing sludges and may even eliminate the need for the conversion of chromium from a hexavalent to a trivalent state.

BRIEF SUMMARY OF THE METHOD OF THE INVENTION

In accordance with the present invention, metal hydroxide, wastewater treatment sludges from electroplating operations (EPA Hazardous waste no. F006) are rendered environmentally safe. The metal hydroxide sludges are dewatered by known means and heated to a temperature sufficient to cause a substantial portion of said metal hydroxides to convert to metal oxides, thereby rendering a metal oxide sludge. Predetermined quantities of silica and soda are added to and mixed with the sludge, either before, during or after conversion to a metal oxide sludge. The mixture is then heated to a temperature sufficient to cause fusion thereof, thus forming a slag-like composition, having the metal oxides in solution. The slag-like composition is then cooled to ambient temperature to form a solidified mass, that is predominantly crystalline in structure and has a substantial quantity of the metal oxides in solid solution, either in a precipitate phase or in a silicate matrix.

The sludges generally comprise co-precipitated metal hydroxides, and may include other compounds such as complex metal cyanides which are not amenable to alkaline chlorination. During the fusion process, simple and complex cyanides are destroyed by reaction with silica and the metal oxides.

In the preferred waste treatment method of the invention: the metal hydroxide sludges are first dewatered to the extent obtainable by conventional means such as concentration in a clarifier and mechanical extraction in a filter press; the mechanically dewatered sludge is then heated in an oxidizing atmosphere to a temperature sufficient to convert the metal-hydroxides to metal oxides, combust any organics which may accompany the sludge and remove the balance of any chemically or mechanically bound water (usually about 650° C.); and the metal oxide sludge thus formed is then mixed with predetermined quantities of soda and silica (or sources thereof) and further heated, again under oxidizing conditions, to a temperature sufficient to cause fusion of the mixture and thereby form the slag-like material having the metal oxides in chemical solution.

The temperature necessary to obtain fusion is usually between about 900° C. and 1,200° C., depending upon composition. The fusion temperature and fluidity of the molten slag-like composition can be reduced by the use of suitable fluxes, such as small additions of borax, sodium chloride or lime (usually not in excess of 5% of the total weight metal oxide sludge/silica/soda mixture). The molten slag-like composition can then be poured into a mold and allowed to solidify in the form of an ingot. An alternative method of casting involves pouring the molten slag into a water spray, thereby causing the slag to solidify in granular form which is readily handled.

Also in the preferred embodiment of the invention, the slag-like composition which is formed upon heating the metal oxide sludge/silica/soda mixture to the fusion temperature, is fluid enough to be poured from a crucible. Because both cyrstallinity upon freezing and fluidity (or conversely, viscosity) in the molten state are dependent upon composition in the preferred embodiment of the waste treatment method of the invention, the slaglike composition is formulated as follows (all quantities being shown in weight percents unless otherwise indicated): Metal Oxides (obtained from the heating of F006 sludges in an oxidizing atmosphere) between about 80% and about 60%; Silica between about 50% and about 15%; and soda between about 3% and about 40%.

The solidified "slag" produced by the method of the present invention, has many advantages over untreated metal hydroxide sludges. The slag is chemically stable, with the environmentally undesirable components either in solid solution or in the form of a precipitate phase in the silicate matrix. The silicate matrix, which carries the heavy metal oxides in solution, is extremely resistant to corrosion, even in a highly acidic environment. The volume of "slag" produced, even with the additions of soda and silica, is about 1/16 of the initial volume of the filter-pressed sludge from which it was formed. The weight of the "slag" produced, even with the additions of silica and soda, is about ⅓ of the initial weight of the filter-pressed sludge from which it was formed. Finally, the complex metal cyanides and any "free" cyanides which are not amenable to destruction by alkaline chlorination or other treatment process, are destroyed by chemical decomposition during the "slagging" process.

It is therefore a primary object of the present invention to provide a waste treatment method for rendering F006 wastes environmentally safe.

It is another object of the present invention to provide a waste treatment method for F006 sludges that treats both heavy metal hydroxides and complex and simple cyanides not amenable to alkaline chlorination.

It is another object of the invention to poovide a waste treatment method for F006 wastes wherein the volume and weight of the final product is less than the volume and weight of the F006 waste which was treated.

It is still another object of the present invention to provide a waste treatment method for F006 sludges that is relatively inexpensive to practice.

Yet another object of the present invention is to provide a waste treatment method wherein the end product produced by such method will remain stable for an indefinite period of time, even in an acidic environment.

It is a feature of the waste treatment method of the present invention, that cyanide salt residues, from other waste treatment or manufacturing processes can be decomposed while simultaneously rendering F006 wastes environmentally safe.

These and other objects and features of the invention will become apparent to one skilled in the art from the following detailed description, appended claims and drawings of which:

DETAILED DESCRIPTION OF THE WSSTE TREATMENT METHOD OF THE INVENTION

Figure 1:
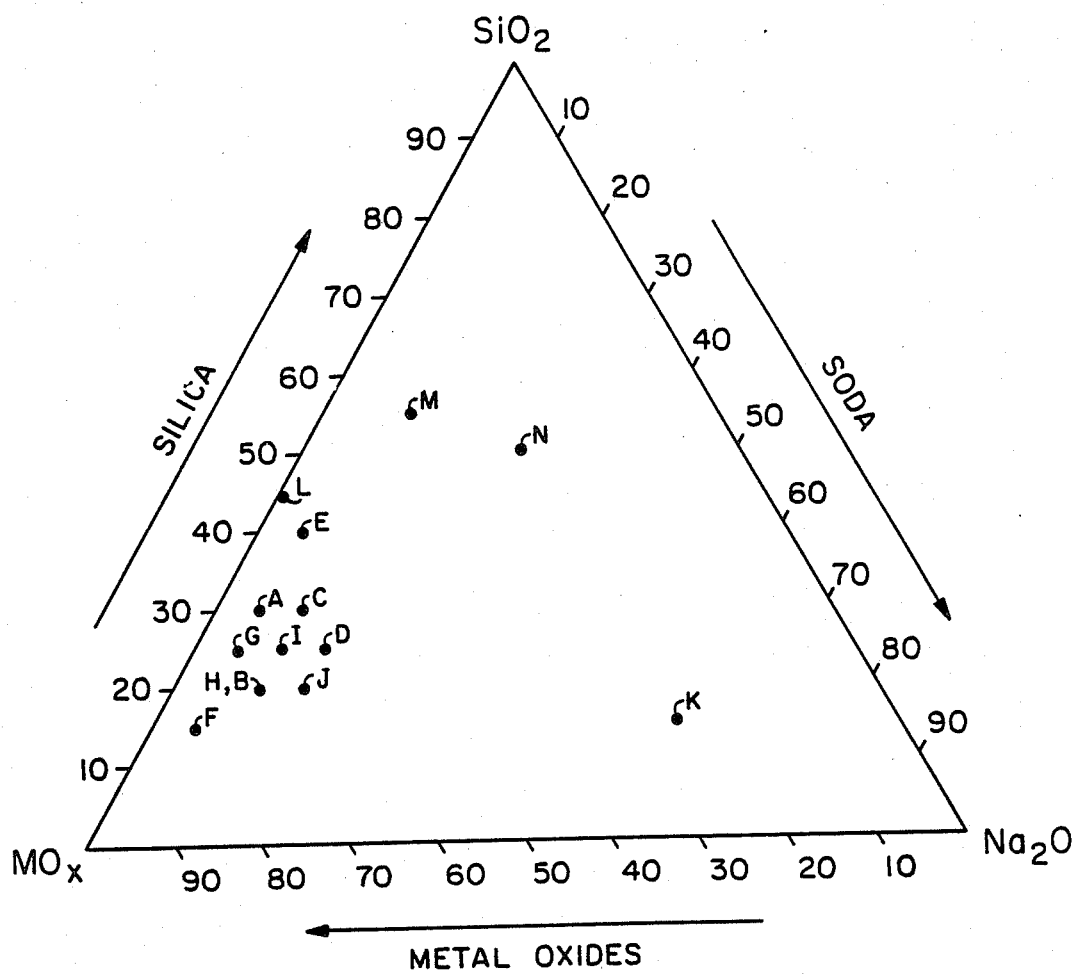
FIG. 1 is a ternary composition diagram (based upon weight percents) with silica, soda and metal oxides (obtained by heating F006 sludges in an oxidizing atmosphere) at the vertices. Also included in the diagram is a plot of a plurality of compositions which were mixed and heated to fusion in accordance with the present invention.

In accordance with the waste treatment method of the present invention, F006 metal hydroxide sludges, generated by the electroplating industry, are rendered environmentally safe. The method of the inventions works to convert the metal hydroxides in the sludge to metal oxides and to dissolve the metal oxides in a slag-like composition which, upon cooling, is predominantly crystalline and which contains the metal oxides in solid solution, either in a precipitate phase or in a silicate matrix. The silicate matrix is extremely resistant to corrosion, even in an acidic environment, so that the possibility of the metals or metal oxides leaching therefrom is extremely remote.

The metal hydroxide sludges are usually generated by coprecipitation from solution, the hydroxide precipitate settling in a clarifier. The coprecipitated metal hydroxides are then usually pumped, in slurry form, to a filter press for water removal. The consistency of the sludges, as removed from the filter press, is generally that of a fairly stiff mud or clay. The filter pressed sludges are often further dewatered by low temperature drying, which is generally carried at a temperature of about 175° centigrade. It will be understood by those skilled in the art that dewatering could be fully carried out by simply heating the coprecipitated metal hydroxides. The mechanical dewatering steps are, however, employed for economy.

In accordance with the present invention, the metal hydroxide sludges are heated, in an oxidizing environment, to a temperature sufficient to cause the metal hydroxides in the sludge to convert to metal oxides, thereby forming a metal oxide sludge. A temperature of about 650° C. centigrade or greater was found to be necessary to accomplish this conversion for substantially all metal hydroxides encountered in F006 electroplating sludges.

As used herein, an oxidizing environment is an environment wherein sufficient oxygen is present to permit the conversion of the metal hydroxides to oxides. In many instances, the metals are divalent and the reaction between two molecules of metal hydroxide (written generically as $M(OH)_2$), with the liberation of one molecule of water, results in the formation of two molecules of metal oxide (written genericalyy as MO). In other instances, the valence of the metals in their hydroxide state may vary from their valance in their oxide state. In such instances, it may be necessary to introduce an external source of oxygen. This is most easily accomplished by conducting said heating step in the atmosphere. It will be understood by those skilled in the art that any source of oxygen which provides an energetically favorable environment for the formation of the metal oxide, will suffice to practice this step. Because the valence of the metals will be found to vary, the term $MO_x$ will be used herein to designate the metal hydroxide sludge which has been converted to a metal oxide sludge. This term is used generically and should not be interpreted as designating or defining the valance state of the metal oxide.

The heating step to convert the metal hydroxide sludge to a metal oxide sludge, also works to liberate any chemically or residual mechanically bound water from the sludge. In addition, this heating step can also serve to rid the sludge of a substantial portion of organics, such as carbon, which may accompany the F006 sludge. If present in too large a quantity, the carbon, or organic sources of carbon, can work to cause reduction of the metal oxides in the subsequent heating step, as will become clear from the discussion below.

The metal oxide sludge formed from the above-described heating step is next mixed with predetermined quantities of silica and soda. Although it is convenient to perform the above heating step before this mixing step, it is not necessary to do so to practice the invention. The above heating step can easily be accomplished after the mixing step without any detrimental result. Because the above heating step results in a substantial loss in volume and weight in the sludge, it is easier to obtain a relatively uniform mixture if mixing is carried out after the conversion of the metal hydroxides to oxides.

Finally, the above mixture of silica, soda and $MO_x$ is heated to a temperature sufficient to cause fusion of the mixture and form a slag-like composition. As used herein, the term "slag-like composition" or simply "slag", means a composition similar to many slags produced from metal melting or smelting operations, in that: it contains metal oxides in chemical solution with silica in its molten state; it has a syrupy or fluid consistency like most slags; and, upon solidification, forms a predominantly crystalline structure, wherein the metal oxides are present in solid solution, in either a precipitate phase or a silicate matrix.

The slag which is formed by the final heating and fusion step is then cooled to ambient temperature. The resulting solidified slag can readily be broken into granular consistency and put to the same uses as other more common slags, i.e. road bed fills, land fill aggregate etc. The molten slag may also be poured into a fluid stream, such a water, wherein the slag stream is broken into droplets which solidify in a granular form.

The method of the invention can be characterized as the thermal fusion of a plurality of tricomponent compositions, which include metal oxides derived from F006 electroplating sludges, soda and silica. Thus, a ternary composition diagram has been used to plot the various compositions studied. FIG. 1 of the drawings shows the ternary composition diagram with the designations of silica, soda and metal oxides at the vertices. Unless otherwise indicated, the weight percents represented by the various points on the diagram were obtained using the following components:

Silica—F80 silica grain from Ottawa Industrial Sand Company, Ottawa, IL. (99%+$SiO_2$, 98% -50 Tyler mesh).

$MO_x$—metal oxides prepared from reagent grade metal salts $FeSO_4$, $CuSO_4$, $NiCl_2$ and $ZnCl_2$. The metal salts were dissolved in tap water and co-precipitated by the addition of NaOH. The resulting sludge was repeatedly washed and filtered to remove traces of the sulfate and chloride salts and dried at 350° F. until the consistency of filter-pressed metal hydroxide sludge was obtained. The sludge was then heated at 650° C., to convert the metal hydroxides to oxides, resulting in a weight loss of about 75 to 80%.

Two different compositions of "synthetic" sludge were prepared from metal salts. The compositions of the sludges were chosen to closely match the ratio of metal hydroxides found in a laboaatory analysis of actual sludge generated by a Chicago area electroplater. In Composition No. 1, the metal hydroxides were present in the following proportions: Fe—33%; Cu—13%; Ni—27%; and Zn—27%. In Composition No. 2, the hydroxides were in the following proportions: Fe—25%; Cu—15%; Ni—30%; and Zn—30%.

$Na_2O$—Soda was calculated on the basis of actual amount soda added or the amount of soda expected to be produced by oxidation of a soda source. For example, it is well-known that sodium carbonate ($Na_2CO_3$) decomposes to $Na_2O$ and $CO_2$ on heating. Thus, the actual amount of soda, $Na_2O$, which would be produced from a known amount of sodium carbonate is represented in the ternary diagram. In the event NaOH was added, it was assumed that all the sodium was converted to $Na_2O$ with the attendant release of $H_2O$. Likewise, it was assumed that one mole of NaCN would oxidize to ½ mole of $Na_2O$.

Slag compositions prepared from the above materials and in accordance with the present invention are plotted in FIG. 1 and appear in Table 1, below:

TABLE 1

| Sample Identity | SLAG COMPOSITIONS PLOTTED IN FIG. 1 | | | |
|---|---|---|---|---|
| | \ | Weight Percents | | |
| | $MO_x$ | $SiO_2$ | $Na_2O$ | NaCN |
| A | 65, #1 | 30 | 4 | 1 |
| B | 70, #1 | 20 | 9 | 1 |
| C | 60, #1 | 30 | 9 | 1 |
| D | 60, #1 | 25 | 14 | 1 |
| E | 55, #1 | 40 | 4 | 1 |
| F | 80, #2 | 15 | 4 | 1 |
| G | 70, #2 | 25 | 4 | 1 |
| H | 70, #2 | 20 | 9 | 1 |
| I | 65, #2 | 25 | 9 | 1 |
| J | 65, #2 | 20 | 14 | 1 |
| K | 25, #2 | 15 | 59 | 1 |
| L | 55, #2 | 45 | — | — |
| M | 30, #2 5 chromic anhydride | 55 | 10 | — |
| N | 20, #2 5 chromic anhydride | 50 | 25 | — |

It should be noted that in many of the slag compositions which appear in Table 1 and FIG. 1, intentional additions of sodium cyanide were made. These additions were made to determine that the method of the present invention was capable of decomposing the residual cyanides which are often found in F006 sludges.

For each of the compositions shown in Table 1 and FIG. 1, an independent laboratory analysis was conducted to determine the EP toxicity level of leachable metals and detectable cyanide. As reported herein, analytical methods for heavy metal leachability conformed to the EP Toxicity Test Procedures set forth in 40 CFR Part 261 App. II, final concentrations being measured with a Perkin-Elmer atomic absorption unit. (Calibration of the unit is carried out on a daily basis employing several known standards.) The presence and concentration of cyanide compounds was determined by Method 412 B of *Standard Methods for the Examination of Waste and Waste Water*, published by the American Public Health Association, American Water Works Association and Water Pollution Control Federation, Washington D.C., referenced in 40 CFR Part 136.3, Table IB, no. 23 Cyanide—Total mg/L. Quality control measures for this procedure include standardization of titration solutions on a weekly basis and the use of color comparison standards of known concentrations for each sample tested in the spectrophotometer. The results of the above testing procedures are tabulated in Table 2, below:

TABLE 2
TOTAL CYANIDE (PPM) AND "LEACHABLE" METAL (mg/L)

| Sample Identity | Total Cyanide | Leachable Metal | |
|---|---|---|---|
| A | 10* | Ni | 9.9 |
| B | 10* | | 14.7 |
| C | 10* | | 10.6 |
| D | 10* | | 4.0 |
| E | 10* | | 3.9 |
| F | 10* | | 5.3 |
| G | 10* | | 2.6 |
| H | 10* | | 0.3 |
| I | 10* | | 6.6 |
| J | 10* | | 3.4 |
| K | 5* | | 0.2 |
| L | — | | 4.1 |
| M | — | Ni | 0.1* |
|   |   | Cr | 1.1 |
| N | — | Ni | 2.6 |
|   |   | Cr | 0.8 |

*denotes less than the detectable limit for the test employed.

Table 2 clearly shows that the method of the invention can effectively render electroplating sludges environmentally safe. As previously noted, an intentional addition of reagent grade sodium cyanide (in the amount of one weight percent) was made to each of samples A through K. After fusion of the mixture, the total cyanide in each sample was less than the detectable limit for the test employed.

In each of samples A through L, heavy metal leachability was determined by measuring only the amount of leachable nickel. The initial "synthetic" sludge mixes contained only iron, nickel, zinc and copper hydroxides. While nickel currently has no upper limit for leachability, it is believed that a maximum concentration of 20 mg/L will soon be added to *Table 1. Maximum Concentration of Contaminants for Characteristic of EP Toxicity*, 40 CFR § 261.24. In each of the above samples the amount of nickel amenable to leaching was below this limit.

Samples M and N both contained hexavalent chromium, in addition to the other metals making up the "sludge". Five weight percent chromic anhydride (based on the total weight of slag) was added directly to synthetic metal oxide sludge along with silica and soda. After fusion, the amount of chromium amenable to leaching was about 1 mg/liter, substantially less than the 5 mg/L which determines EP Toxicity.

In addition to treating "synthetic" metal hydroxide sludges, an actual sample of metal hydroxide sludge, generated by a Chicago area electroplater, was treated in accordance with the present invention. This sludge was analyzed and found to contain approximately 11.4 weight percent metal. The total metal content was made up of the following weight percents: 5.2% Cd; 18.2% Fe; 31.7% Ni; 14.4% Cu; 30.2% Zn and 0.2% Sn.

The above metal hydroxide sludge was dried at 700° centigrade thus being converted to metal oxide sludge, $MO_x$. The metal oxide sludge was then combined with silica, soda and flux in the following proportions: 70 weight % $MO_x$; 20 weight % Silica; 7 weight % Soda; and 3 weight % Borax. This mixture was heated to about 1,000° centigrade in a plumbago crucible, which caused the mixture to fuse to a slag-like composition. The slag was then poured from the crucible into a cast iron mold and allowed to cool to ambient temperature.

The sample slag was then submitted for toxicity testing pursuant to 40 CFR Part 261, Appendix II. Testing for all metals listed therein (arsenic, barium cadmium, chromium, hexavalent chromium, lead, mercury, selenium, silver, and nickel) yielded a result of less than 0.1 mg/l, less than the detectable limit, for all metals except nickel. Nickel was found in the amount of 20 mg/L, still a remarkably low result.

Microscopic investigation of the slag revealed some small metal prills dispersed throughout the sample. It was believed that these prills contributed to the high nickel result. It is also believed that these prills could be eliminated by fusing in a crucible free of graphite or carbon, as is explained below.

Figure 4:
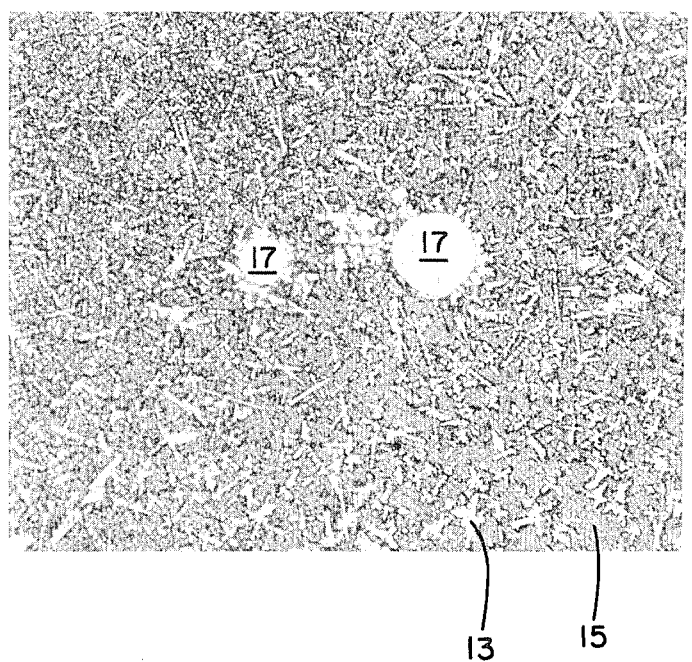
FIG. 4 is a photomicrograph (magnification 400 diameters) of a sample of the slag-like composition produced from metal oxides sludge, silica and soda in accordance with the present invention. After fusion, the sample was mounted in a bakelite specimen mount, ground and polished.

Referring now to FIG. 4, there is shown a photomicrograph of a slag-like composition formed by the waste treatment method of the invention. The slag-like composition shown in FIG. 4 had a composition identical to that formed from the electroplater's sludge in the preceding example, except that it was formulated from synthetically produced sludge. FIG. 4 is a high magnification photomicrograph and shows a plurality of dendrites 13 surrounded by a silicate matrix 15. It is believed that the dendrites 13 have a higher concentration of metal oxides than the silicate matrix 15. It is clear from FIG. 4 that the structure of the slag-like composition is predominantly crystalline. The term "predominantly crystalline", as used herein, means a structure wherein at least one-half of the volume percent of the structure is crystalline. The silicate matrix 15 which surrounds the dendrite 13 is also crystalline, although the crystal interfaces associated therewith are not readily discerned in the photomicrograph.

FIG. 4 also reveals metal prills 77, also encased in silicate matrix 15. These prills, even if amenable to leaching, have such a small surface area exposed and are protected by the silicate matrix to such an extent that their presence has very little affect upon the toxicity of the end product. Nonetheless, the use of a purely oxidizing condition during the heating to fusion of the mixture of the soda, silica and metal oxide sludge components can eliminate the formation of these prills. On the other hand, if it is desirable to reclaim the metal from the electroplating sludges, heating to the proper temperature can cause the metal to collect at the bottom of the crucible and the slag will retain its environmentally safe condition.

Initially, these experiments were attempted utilizing reagent grade, metal oxide mixes, formulated in proportion to the hydroxides present in actual electroplating sludges. A great deal of difficulty was encountered in fusing the components. Very high temperatures and long furnace times did finally result in fusion.

On the other hand, it was discovered that fusion could occur quite rapidly and at relatively low temperatures when metal hydroxides were first coprecipitated and then converted to oxides. It is theorized that coprecipitation produces a mixture having extremely intimate contact between the various metal hydroxide species. It is believed that this intimate contact is preserved during the conversion to oxides and thereby permits rapid alloying with an attendant decrease in melting temperature. In a mixture of metal oxide granules, very little of the surface area of the individual granules is in contact, which hinders alloying of the constituents.

First attempts to fuse the metal oxide sludge/silica/- soda mixtures were carried out in plumbago crucibles, heated in a gas-fired furnace. It was soon discovered that the graphite in the crucibles would readily reduce a substantial portion of the metal oxides to a low-melting alloy pool of unknown composition. The use of fire clay crucibles worked to abate the problem of metal reduction.

As previously mentioned, the soda constituent in the ternary composition of the synthetic slag need not be added in the form of pure soda. It has been found, in fact, that several sources of sodium can be oxidized to soda, among them sodium hydroxide and sodium cyanide. In the case of sodium cyanide, it is believed that a substantial amount of the oxidation takes place by reaction with silica and metal oxide. (Many metal oxides, in particular iron, can exhibit various states of oxidation. Thus, iron oxide, for instance, can be reduced from $Fe_2O_3$ to $FeO$ without reducing to pure metal.) It is also believed that these reactions can result in the liberation of free carbon from the cyanide radical. In several experiments, where large quantities of sodium cyanide were intentionally added to the ternary mix, it is believed that the liberation of carbon from the cyanide radical caused a portion of the metal oxides to be reduced to metal.

Figure 2:
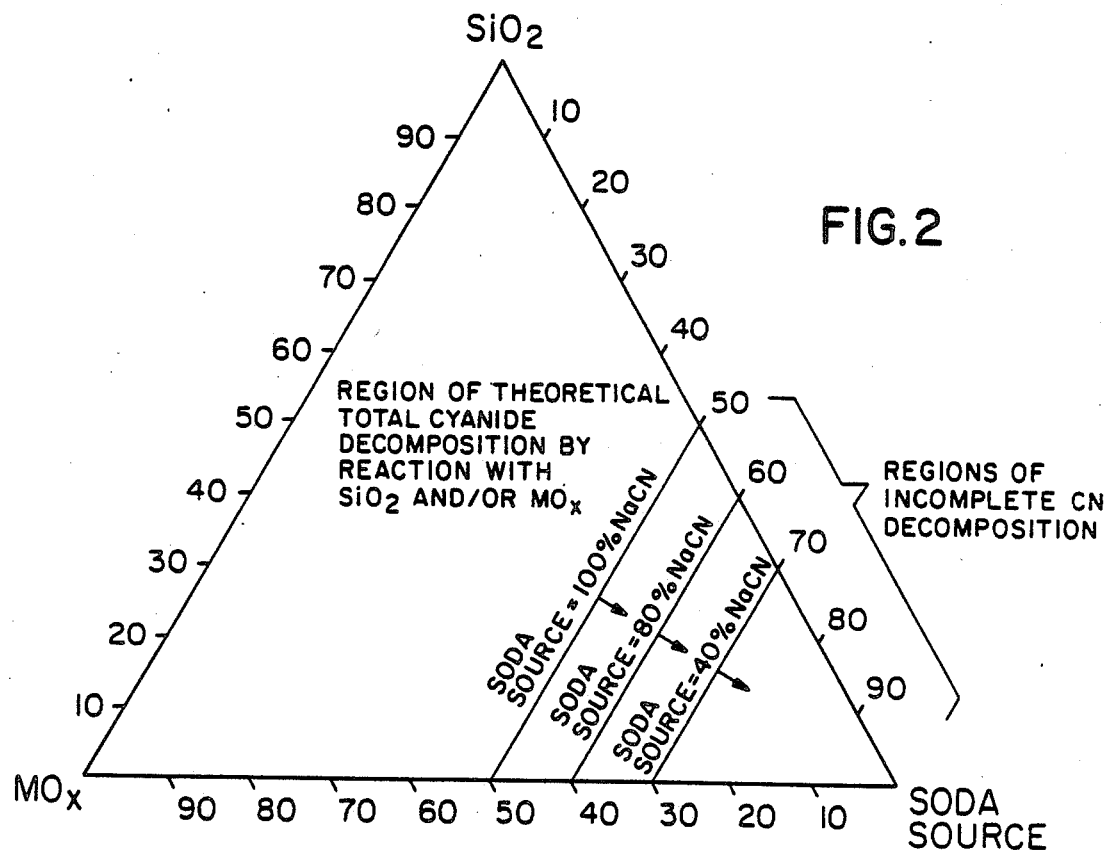
FIG. 2 is a ternary composition diagram (based upon mole percents) similar to that shown in FIG. 1 but showing the approximate proportion of sodium cyanide in a soda source which can be decomposed in accordance with the present invention.

Furthermore, the oxidation of sodium cyanide by silica has been recently investigated at Oak Ridge National Laboratories, Oak Ridge Tennessee (Bamberger, C. E. *REACTION OF SILICON DIOXIDE WITH SODIUM CYANIDE AT* 1000° C., Reactivity of Solids, 2 (1986) pp. 277–282, Netherlands). The author found that the oxidation of sodium cyanide occurred in a substantially one-to-one molecular ratio. This implies that, in the ternary composition diagram of $MO_x/SiO_2/Na_2O$, there exists a family of curves which divide the composition field into areas of detectable and nondetectable cyanide upon fusion, depending upon the concentration of cyanide in the soda source. FIG. 2 shows such a family of curves, the composition limits being scaled in mole percents.

On the basis of the foregoing, it is believed that substantial quantities of silica may have been dissolved from the fire clay crucibles during fusion. The crucibles were subjected to quite severe attack and had a glazed appearance after firing.

Figure 3:
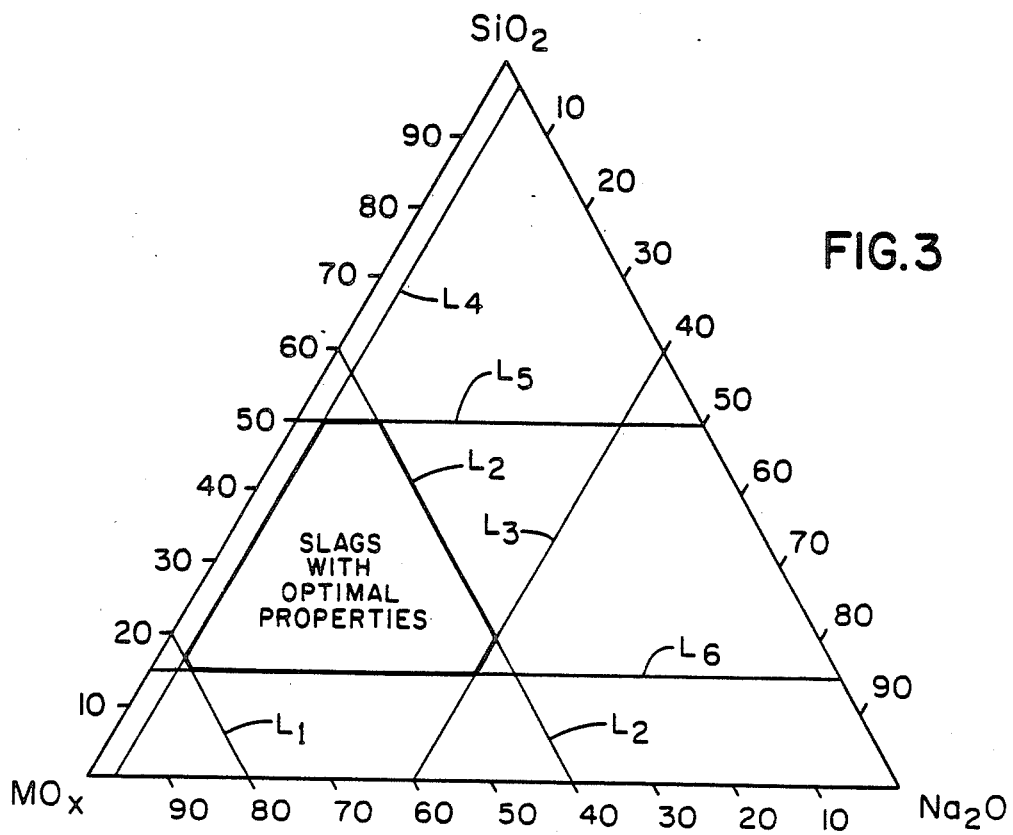
FIG. 3 is a ternary composition diagram, identical to that shown in FIG. 1 (based upon weight percent) but showing the composition ranges of silica, soda and metal oxide sludge for the preferred method of the present invention.

Referring now to FIG. 3, there is shown the preferred limits of composition expressed in weight percent, placed upon the ternary composition diagram, for practicing the waste treatment method of the invention.

Lines 1 and 2 represent upper and lower limits upon the amount of metal oxide sludge added to the slag, respectively. Because one of the goals of the invention is to "bind" or "tie up" heavy metals, the lower limit on metal oxide content is chosen to represent the perceived, lowest level which is economically feasible, when compared to other means of disposal. The upper limit on metal oxides is based on fusion temperature. If the concentration of metal oxides is too high, the fusion point of the mixture becomes too high for the method to be carried out using ordinary, gas-fired foundry furnaces.

Line 3 represents an upper limit of soda which should be used in the slag-like composition. It is well-known that, in the soda/silica binary system, the greater the ratio of soda to silica, the greater the water solubility of the silicate. While it is believed that the addition of metal oxides reduces the water solubility of a given soda/silica ratio, it is an object of the invention to render the resulting material substantially insoluble in an acidic environment, thus preventing the escape of toxic metals.

Line 4 represents the minimum amount of soda recommended for practicing the present invention. Again, this line is chosen for the fluxing properties of soda, which lowers the fusion point of the mixture.

Line 5 represents a practical upper limit on the amount of silica in the slag. This limit is chosen in an attempt to hold the fusion temperature of the slag below 1,300° C. Silica contents in excess of this line will still produce acceptable slags but will require longer furnace times and substantially higher temperatures to obtain fusion. Line 5 is also chosen for the fluidity of the molten slag composition and the crystalline nature of the composition upon freezing. High silica contents tend to become glassy and, at high temperatures are very viscous. Furthermore, crystalline silicate matrices tend to be more stable than super cooled glasses.

Line 6, the lowest amount of silica, is also chosen because of the lower fusion point of a ternary system (as compared to a binary system) and because silicates provides a corrosion-resistant matrix for holding the metal oxides in solid solution.

Most of the preferred composition limits have been chosen on the basis of lowering the fusion points of the composition. It has also been discovered that various other fluxes can be added to the slag to lower the fusion point without sacrificing chemical stability. Three such materials are borax, sodium chloride and calcium fluoride (borax being used in the above-described example with actual electroplating sludge). The effect of these materials, even when added in small quantities (of the order of a few weight percent), is to substantially lower not only the fusion point but the viscosity of the molten slag. Thus, these fluxing compounds should be kept in mind as possible additives for any large scale treatment opration requiring slag fluidity.

In the waste treatment method of the invention, the decomposition of cyanides is so effective that pure sodium cyanide can be substituted for the soda constituent in many slag compositions. The "slagging" process also permits the substitution of a number of sodium compounds for the soda constituent. NaOCN, NaOH and NaCl have all been successfully used to form a slag-like composition from metal hydroxide sludges. Thus, a source of soda, which yields up the desired quantity of soda during the heating steps of the invention, can be substituted for pure soda.

Another excellent source of soda for the waste treatment method of the present invention can be found in the retort residue which is generated when practicing a companion invention, entitled *METHOD FOR DECOMPOSING THE CYANIDE RADICAL IN CYANIDE-BEARING WASTES OR MATERIALS* (disclosed in currently pending U.S. patent application Ser. No. 07/059,123, filed on June 5, 1987, and assigned to Rostoker, Inc.). Thus, the method of the invention provides a means for consuming undesirable sodium salts which may be generated by other processes. (It is further anticipated that other alkali and alkali-metal salts can be consumedbby the waste treatment method of the present invention).

Finally, it is not necessary to use a high purity form of silica in the waste treatment process of the invention. Environmentally safe slags have been made using silica foundry sand, crushed glass from broken bottles, sand and lime mixtures and aluminosilicates. As with the case of soda, only a source which contains or yields up the desired quantity of silica during the fusion step is necessary.

It is believed that the above-described process can be economically employed for the treatment of F006 wastes. The process accomplishes the destruction of residual cyanides and binds the metals, in oxide form, in solid solution, either in a precipitate phase or in a silicate matrix. Thus, the final product which is rendered by the waste treatment method of the invention, is extremely stable and readily passes the EP toxicity test.

It is anticipated that the method of the invention can be carried out on either: a large scale at a central processing facility serving a given geographic region; or on a small scale at the generator site, using small, gas-fired furnaces. Obviously, a large scale operation employing a reverberatory furnace (of the type used in the glass industry) could minimize energy and refractory costs.

The method of the present invention has been shown, by various examples, to be an effective method for rendering F006 sludges environmentally safe. The examples and preferred embodiments are included for purposes of clarity and illustration. It will be apparent to those skilled in the art that various modifications, alternatives and equivalents of the method of the invention can be made without departure from the spirit of the invention. The scope of the invention, then, should be defined only by the appended claims and equivalents thereof.

What is claimed is:

1. A waste treatment method for metal hydroxide sludges generated from electroplating waste water treatment, said method comprising the steps of:
    dewatering said sludge;
    heating said metal hydroxide sludge, in an oxidizing environment, to a temperature sufficient to cause substantially all said metal hydroxides in said sludge to convert to metal oxides, thereby forming a metal oxide sludge;
    mixing said metal hydroxide sludge, or said metal oxide sludge formed therefrom, with predetermined quantities of silica and soda;
    heating said mixture of metal oxide sludge, silica and soda, to a temperature sufficient to cause fusion thereof to form a slag-like composition; and
    cooling said fused slag-like composition to ambient temperature to form a solidified mass that is predominantly crystalline in structure and has a substantial quantity of said metal oxides in solid solution, either in a precipitate phase or in a silicate matrix.

2. A method in accordance with claim 1 wherein said conversion of said metal hydroxide sludge to said metal oxide sludge is carried out before said mixing step and said predetermined quantity of silica is between about 15 weight percent and about 50 weight percent, said predetermined quantity of soda is between about 3 weight percent and about 40 weight percent and the balance of the total mixture formed thereby is metal oxide sludge derived from the metal hydroxide sludge.

3. A method in accordance with claim 2 wherein said metal oxide sludge, derived from said metal hydroxide sludge, comprises between about 40 weight percent and about 80 weight percent of said mixture which is formed by said predetermined additions of silica and soda.

4. A method in accordance with claim 1 further comprising the step of adding a predetermined quantity of flux to said mixture or slag-like composition.

5. A method in accordance with claim 4 wherein said fluxes are chosen from the group consisting of borax, lime, sodium chloride and calcium fluoride.

6. A method in accordance with claim 5 wherein said temperature which is sufficient to cause fusion is less than or equal to about 1,000° centigrade.

7. A method in accordance with claim 4 wherein said heated and fused slag-like composition has fluidity sufficient to permit pouring of said fused composition from a crucible.

8. A method in accordance with claim 1 wherein said temperature to cause fusion is less than about 1,300° C.

9. A method in accordance claim 1 wherein said temperature to cause conversion of said metal hydroxide sludge to metal oxide suudge is about 650° centigrade.

10. A method in accordance with claim 1 wherein said step of cooling said slag-like composition is carried out by cooling said composition in a fluid steam having sufficient cooling capability and force to cause said slag-like composition to solidify in substantially granular form.

11. A method in accordance with claim 1 wherein said predetermined quantity of silica is added by adding a quantity of material or materials that yields or yield said predetermined quantity of silica.

12. A method in accordance with claim 1 wherein said predetermined quantity of soda is added by adding a material or materials which yields or yield said predetermined quantity of soda.

13. A method in accordance with claim 1 wherein said cooled, slag-like composition is environmentally safe.

14. A method in accordance with claim 13 wherein said sludge includes substantial quantities of hexavalent chromium.

15. A method in accordance with claim 13 further comprising the step of adding toxic metals from sources other than said sludge.

16. A method in accordance with claim 1 wherein said metal hydroxide sludge includes cyanide compounds and said cyanide compounds are decomposed by said waste treatment method.

17. A method in accordance with claim 1 further comprising the step of reducing a substantial quantity of said metal oxides to metal during said step of heating to fusion.

* * * * *